Patented Mar. 29, 1938

2,112,329

UNITED STATES PATENT OFFICE 2,112,329

PROCESSES OF OBTAINMENT OF THE LACTAM OF GLUTAMIC ACID

Géza Braun, New York, N. Y., assignor to Standard Brands Incorporated, New York, N. Y., a corporation of Delaware No Drawing. Application September 2, 1936, Serial No. 99,167

11 Claims. (Cl. 260—123).

This invention relates to the production and isolation of the lactam of glutamic acid (this lactam also having been called pyrrolidone-α-carboxylic acid).

d-glutamic acid, being an α-amino acid, forms an internal anhydride, a lactam, under proper conditions. This lactam is of strongly acid properties and has decided advantages over the amphoteric glutamic acid in certain chemical and physiological reactions.

It is already known and reported in scientific literature that glutamic acid when heated to between 150° and 180° C. loses one molecule of water from each molecule of glutamic acid so that it is thereby converted into its lactam. By such a process, however, as heretofore conducted and described, a production of the lactam on a large scale with efficient and satisfactory operation and results would not be possible. The glutamic acid does not itself melt at the optimum temperature of the lactam formation but remains in the solid form at least until such a time as the formation of lactam and liberation of water from the glutamic acid may serve to liquefy the material under treatment. The transmission of heat through the solid mass of glutamic acid under treatment is extremely poor and this renders the production of the desired lactam very slow so that a long period of heating is required. Furthermore, the long period of heating required at the high temperature involved has the disadvantage that the d-glutamic acid used as initial material is not all converted into the desired lactam but a portion of it is converted into the optically inactive variety of glutamic acid, namely dl-glutamic acid, which involves a loss from the point of view of the desired result of the process, namely the lactam production.

It is an object of the present invention to produce the lactam of glutamic acid from d-glutamic acid by an economical and practical method while restricting the accompanying formation of dl-glutamic acid and with production and recovery of a high yield of the lactam.

In experiments upon which the present invention is based, I have discovered that a temperature of 155° C. to 165° C. is especially favorable for the production of glutamic acid lactam from d-glutamic acid while avoiding the accompanying formation of any substantial proportion of the undesired dl-glutamic acid. The reaction is greatly facilitated by occasional or slow continuous stirring of the material, and under these conditions the formation of the lactam is initiated with consequent liberation of a molecule of water from each molecule of glutamic acid converted into the lactam, and as the reaction thus proceeds the reaction mass is liquefied, this liquefaction in its incipiency serving to facilitate the stirring and heat distribution to a great extent. However, as the liberated water further accumulates in the reaction mass it then acts undesirably to impede the further conversion of remaining glutamic acid into the desired lactam and to prolong the period of heating required for completion of such conversion to the fullest practical or possible extent. Therefore, after an initial liberation of a small proportion of water and formation of lactam and consequent liquefaction of the reaction mass it is, as I have discovered, highly advantageous to effect the removal of water sufficient to prevent its further and undue accumulation. For this purpose I have found it especially advantageous, after the reaction has been initiated and has proceeded to the stage of liquefaction, to thereafter subject the material undergoing reaction to a reduced pressure. By connecting the reaction vessel to a suitable suction apparatus for maintaining a reduced pressure, water is distilled and withdrawn as vapor from the reacting material so that in the further production of lactam no disadvantageous accumulation of water occurs. Then the heating is continued until the reaction mass becomes a clear solution (indicative of the approximately complete conversion of the glutamic acid into its lactam). The completion of the desired lactam-forming reaction is also indicated when tests show a proportional loss in weight from the material corresponding to the weight of one molecule of water for each molecule of glutamic acid initially present in the reaction mass.

When the process is conducted in accord with the preferred embodiment of my invention as just described, nearly all the glutamic acid is converted into the desired lactam, usually not more than about 5% of it being converted into dl-glutamic acid. The reaction mixture may be allowed to cool to a certain extent and then dissolved in water. This treatment serves to dissolve the lactam without dissolving any material proportion of dl-glutamic acid, and the resulting lactam solution is filtered while cold, preferably concentrated to about a thin syrupy consistency and from this concentrated solution, on cooling to about 0° C. a yield of the lactam is crystallized corresponding to about 65% to 70% of the amount of lactam theoretically obtainable from the quantity of glutamic acid initially used. Assuming a possible 5% conversion of d-glutamic acid into dl-glutamic acid has taken place, as above mentioned, this leaves about 20% to 25% or slightly more of the theoretically obtainable lactam still remaining in the mother liquor.

This mother liquor, as mentioned, may be of a syrupy consistency, and when it is heated, for about two to three hours on the water bath or otherwise at a temperature of about 90° C., with an addition of concentrated hydrochloric acid, the lactam of glutamic acid remaining in the mother liquor is converted into glutamic acid hydrochloride which, being substantially insoluble in the presence of hydrochloric acid, may be readily separated as an insoluble precipitate and may be converted into glutamic acid for further treatment for lactam production or for other use as desired.

The following is given as an illustrative example of my process, although the details may be varied to some extent without departing from my invention, which is defined in the claims hereto appended.

d-Glutamic acid 100 parts is placed into a suitable container such as a glazed container suitable for vacuum distillation and also provided with a stirrer, and is heated to 155° C. to 165° C. with occasional stirring. In about 1 to 2 hours the material begins to liquefy and the apparatus is then subjected to a reduced pressure (suitably corresponding to an absolute pressure of about 600 millimeters of mercury and with such further reduction in pressure, as the reaction proceeds, that at the end of the process a reduction to an absolute pressure of about 50 millimeters of mercury has been attained) and the water liberated in the lactam-forming reaction is slowly distilled off. The reaction is continued under reduced pressure and with suitable heating until no more water distils over and the liquid in the container becomes clear. The liquid material is now cooled with continuous stirring before it solidifies so that it solidifies in comminuted or fragmental form. Then it is treated with cold water 150 parts and the solution thus formed is cooled to about 0° C. and undissolved matter then present in the solution is removed from it by filtration. This insoluble matter (about 5 parts from 100 parts of d-glutamic acid) consists of dl-glutamic acid, which is a valuable by-product and may be put to known uses. The filtrate is concentrated to a thin syrupy consistency, dissolved in ethyl acetate so as to form a clear solution and is then cooled to —5° C. and after being maintained at this temperature for about an hour the crystallization of the glutamic acid lactam will be substantially as complete as practically obtainable; the crystallized lactam is removed from associated liquid by filtration and is washed with an ice cold mixture of equal parts of alcohol and ethyl acetate; the filtrate is concentrated to a thin syrupy consistency and cooled as in effecting the first crystallization and a second crop of lactam crystals is thus obtained. By the two crystallizations, a total amount of about 60 parts of pure lactam of glutamic acid is obtained.

Most of the lactam still remaining in the final mother liquor cannot be crystallized from it satisfactorily and such remaining lactam is, therefore, converted into glutamic acid hydrochloride by concentrating the mother liquor to a thick syrupy consistency under reduced pressure and heating the concentrated material with an equal quantity of concentrated hydrochloric acid (suitably of 32% strength) at a temperature of about 100° C. for about 2 to 3 hours. Then the excess of hydrochloric acid is removed by distillation, leaving a residue of a syrupy consistency and this residue is dissolved in an equal quantity of cold concentrated hydrochloric acid (suitably of about 32% strength) and the solution thus prepared is cooled to 0° C. to —10° C. (zero to minus 10° C.). On this treatment, glutamic acid hydrochloride separates, and is removed from the associated liquid by filtration, washed with concentrated hydrochloric acid and dried. About 20 parts of pure glutamic acid hydrochloride is thus obtained as an additional valuable product which can, of course, if desired, be converted into glutamic acid and further treated for glutamic acid lactam production.

The conversion of the lactam of glutamic acid, remaining in the final mother liquor, into glutamic acid, may be effected by heating with alkalies or alkaline earth metal hydroxides such as sodium hydroxide (NaOH) or barium hydroxide $(Ba(OH)_2)$ if desired. However, since the alkalies, at high temperatures, tend to convert the optically active derivatives into optically inactive ones, I prefer to effect the conversion with hydrochloric acid as described.

For certain purposes, with respect to which the by-products associated witth the lactam of glutamic acid as formed may not be detrimental, the crude product containing the lactam may be used without recrystallization.

Having described my invention, what I claim and desire to secure by Letters Patent is:—

1. A process of production of the lactam of glutamic acid, comprising the steps of heating d-glutamic acid to a temperature of about 155° C. to 165° C. until glutamic acid lactam formation has thereby been initiated and has progressed to a sufficient extent that the mass undergoing reaction has become liquefied and thereafter continuing the heating of the mass undergoing reaction, under a pressure sufficiently below atmospheric pressure to effect removal of at least a substantial portion of the water as liberated in the further progress of the reaction.

2. A process as defined in claim 1, in which the material undergoing heating is subjected to agitation during at least a portion of the period of heating.

3. A process as defined in claim 1, in which the heating of the reaction mass is continued until no more water is removed.

4. A process as defined in claim 1, in which the heating of the reaction mass is continued until its loss in weight corresponds substantially to the weight of one molecule of water for each molecule of glutamic acid initially used, and in which the residue of the reaction mass, consisting mainly of the lactam of glutamic acid, is dissolved in water, the resulting solution is filtered and the lactam of glutamic acid is crystallized from the resulting filtrate.

5. In the treatment of an aqueous solution containing the lactam of glutamic acid as a principal constituent, for the recovery of valuable products from such solution, the steps which comprise effecting crystallization therefrom of a large proportion of the lactam of glutamic acid present in the solution, separating the crystallized lactam from the associated mother liquor, and thereafter heating the remaining mother liquor with a hydrolysis-promoting reagent under conditions effecting the hydrolysis of the residual uncrystallized lactam which it contains.

6. A process as defined in claim 5, in which the hydrolysis-promoting reagent is hydrochloric acid.

7. A process as defined in claim 1, in which the heating of the reaction mass is continued until no more water is removed, and in which the reaction mass, at the conclusion of the heating, is cooled to effect its solidification, treated with water for producing a solution of the lactam, and in which the solution is filtered and the filtrate is concentrated and subjected to at least one stage of crystallization for obtainment of the lactam in solid form.

8. In a process of glutamic acid lactam recovery from solutions containing said lactam, the steps which comprise effecting crystallization of the lactam from a solution containing the lactam together with at least a modicum of other substances soluble in a mixture of ethyl alcohol and ethyl acetate, filtering out the crystallized lactam from the remaining associated mother liquor, and washing the separated crystallized lactam with a mixture of ethyl alcohol and ethyl acetate at a low temperature.

9. A process as defined in claim 1, in which successively lower subatmospheric pressures are employed during the glutamic acid lactam-forming reaction, after initiation of the reaction and liquefaction of the material undergoing reaction by heating.

10. A process as defined in claim 1, in which, after initiation of the glutamic acid lactam-forming reaction and liquefaction of the material undergoing reaction by heating, the pressure is progressively reduced until at the termination of the lactam-forming reaction the material under treatment is under a pressure of about 50 millimeters of mercury absolute pressure.

11. A process as defined in claim 1, in which, after initiation of the glutamic acid lactam-forming reaction and liquefaction of the material undergoing reaction by heating, the pressure is reduced to about 600 millimeters of mercury and thereafter, during the further course of the reaction, is progressively reduced to about 50 millimeters of mercury.

GÉZA BRAUN.